United States Patent
Riegel et al.

(10) Patent No.: US 8,026,315 B2
(45) Date of Patent: Sep. 27, 2011

(54) PRODUCTION OF WATER-ABSORBING POLYMERIC PARTICLES

(75) Inventors: Ulrich Riegel, Landstuhl (DE); Thomas Daniel, Waldsee (DE); Dieter Hermeling, Böhl-Iggelheim (DE); Mark Elliott, Ludwigshafen (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 726 days.

(21) Appl. No.: 11/816,771

(22) PCT Filed: Mar. 28, 2006

(86) PCT No.: PCT/EP2006/061087
§ 371 (c)(1),
(2), (4) Date: Aug. 21, 2007

(87) PCT Pub. No.: WO2006/103227
PCT Pub. Date: Oct. 5, 2006

(65) Prior Publication Data
US 2008/0161522 A1  Jul. 3, 2008

(30) Foreign Application Priority Data
Mar. 30, 2005 (DE) .......................... 10 2005 014 841

(51) Int. Cl.
*C08F 8/00* (2006.01)
*C08F 20/06* (2006.01)

(52) U.S. Cl. .......... 525/329.7; 526/65; 526/73; 526/88; 526/303.1; 526/317.1; 525/329.4; 525/330.2; 525/374; 525/375; 525/384

(58) Field of Classification Search .............. 525/329.4, 525/329.7, 330.2, 374, 375, 384; 526/65, 526/73, 88, 303.1, 317.1
See application file for complete search history.

(56) References Cited

U.S. PATENT DOCUMENTS

| | | | |
|---|---|---|---|
| 5,576,401 A | 11/1996 | Steiger et al. | |
| 5,856,410 A | 1/1999 | Carrico et al. | |
| 6,194,531 B1 | 2/2001 | Hatsuda et al. | |
| 6,667,372 B1 | 12/2003 | Miyake et al. | |
| 6,710,141 B1 | 3/2004 | Heide et al. | |
| 2004/0186229 A1 | 9/2004 | Heide et al. | |
| 2005/0051925 A1 | 3/2005 | Gartner et al. | |

FOREIGN PATENT DOCUMENTS

| | | |
|---|---|---|
| EP | 0 632 067 | 1/1995 |
| EP | 0 811 636 | 12/1997 |
| EP | 811636 * | 12/1997 |
| EP | 0 876 888 | 11/1998 |
| EP | 0 955 086 | 11/1999 |
| EP | 1 097 946 | 5/2001 |
| JP | 11/302306 | 11/1999 |
| WO | WO-93/21237 A1 | 10/1993 |
| WO | WO-01/38402 | 5/2001 |

OTHER PUBLICATIONS

International Search Report in PCT/EP2006/061087 dated Jul. 10, 2006.
Buchholz and Graham, "Modern Superabsorbent Polymer Technology", Wiley-VCH, pp. 69-118 (1998).

* cited by examiner

*Primary Examiner* — Roberto Rabago
(74) *Attorney, Agent, or Firm* — Marshall, Gerstein & Borun LLP

(57) ABSTRACT

The present invention relates to a process for producing water-absorbing polymeric particles by polymerizing a monomer solution, which comprises removing the polymer gel from the reactor when the gel temperature is at least 50° C. and the monomer conversion is not more than 90 mol %, and also to a process for producing hygiene articles.

17 Claims, No Drawings

PRODUCTION OF WATER-ABSORBING POLYMERIC PARTICLES

CROSS-REFERENCE TO RELATED APPLICATIONS

This is the U.S. national phase application of International Application No. PCT/EP2006/061087, filed Mar. 28, 2006, which claims the benefit of German patent application No. 10 2005 014 841.7, filed Mar. 30, 2005.

The present invention relates to a process for producing water-absorbing polymeric particles by polymerizing a monomer solution, which comprises removing the polymer gel from the reactor when the gel temperature is at least 50° C. and the monomer conversion is not more than 90 mol %, and also to a process for producing hygiene articles.

Further embodiments of the present invention are discernible from the claims, the description and the examples. It will be understood that the hereinbefore mentioned and the hereinbelow still to be more particularly described features of the subject matter of the present invention are utilizable not only in the particular combination indicated but also in other combinations without departing from the realm of the invention.

Water-absorbing polymers are in particular polymers of (co)polymerized hydrophilic monomers, graft (co)polymers of one or more hydrophilic monomers on a suitable grafting base, crosslinked ethers of cellulose or of starch, crosslinked carboxymethyl-cellulose, partially crosslinked polyalkylene oxide or natural products swellable in aqueous fluids, such as guar derivatives for example. Such hydrogels are used as products capable of absorbing aqueous solutions to produce diapers, tampons, sanitary napkins and other hygiene articles, but also as water-retaining agents in market gardening.

Manufacturing processes for water-absorbing polymers are described in "Modern Superabsorbent Polymer Technology", F. L. Buchholz and A. T. Graham, Wiley-VCH, 1998, pages 69 to 118. A monomer solution is polymerized, for example in a kneader or a belt reactor, to form a base polymer.

To improve its performance characteristics, the base polymer is typically surface or gel postcrosslinked. This postcrosslinking is well known and is preferably carried out in the aqueous gel phase or as surface postcrosslinking of ground and screened polymeric particles.

EP-A-0 811 636 teaches the production of crosslinked polymers in a kneader wherein the polymerization is initially carried out in the absence of shearing. It is only after the gelling of the monomer solution and before reaching the peak temperature that the kneading hooks are started up and the polymer gel is divided by shearing.

JP-A-11/302306 describes a process for producing water-absorbing polymers wherein the polymerization is carried out by stirring until a degree of polymerization of not more than 30% is reached. The remaining reaction takes place on a continuous belt reactor.

EP-A-0 955 086 teaches the production of polymer gels on a belt reactor to produce a uniformly polymerized gel on the belt.

EP-A-1 097 946 describes an improved belt reactor for producing water-absorbing polymers, in which heat is removed in an upstream zone of reaction and supplied in a downstream zone of reaction, and also the control of the process through contactless measurement of gel temperature. Here too, the polymer gel is only divided after the peak temperature has been reached.

EP-A-0 876 888 discloses dividing the polymer gel without squashing, by using specific cutting blades. This is said to avoid the mechanical rupture of crosslinking sites in the polymer gel and to reduce the fraction of extractables in the end product.

WO-A-03/38402 teaches the production of crosslinked polymers in a continuous kneading reactor. The heat of reaction is removed at least in part by evaporating the water present as solvent.

The present invention has for its object to provide an improved process for producing water-absorbing polymeric particles wherein in particular the fraction of extractables shall be low. The present invention has for its object in particular to provide an improved process for producing water-absorbing polymeric particles wherein the solids content of the monomer solution and the space-time yield in the reactor shall be high.

We have found that this object is achieved by a process for producing water-absorbing polymeric particles by reacting a monomer solution to form a polymer gel, which comprises removing the polymer gel from the reactor when the gel temperature is at least 50° C. and the monomer conversion is not more than 90 mol %.

The gel temperature is the temperature of the polymer gel formed in the course of the polymerization, the dynamic viscosity of polymer gels being preferably at least 1000 mPas, more preferably at least 5000 mPas and most preferably at least 25 000 mPas.

The monomer conversion is the quotient of residual monomer and starting monomer. The residual monomer content can be determined for example by EDANA (European Disposables and Nonwovens Association) recommended test method No. 410.2-02 "Residual monomers".

But it is also possible to determine the monomer conversion via the heat of reaction released.

The process of the present invention is preferably carried out as a continuous operation.

The polymerization can be carried out in the reactor as a static polymerization or as a dynamic polymerization. A polymerization is referred to as static when the reaction mixture is not actively commixed in the reactor. Suitable reactors for static polymerization are belt reactors as described in DE-A-38 25 366 and U.S. Pat. No. 6,241,928. A polymerization is referred to as dynamic when the reaction mixture is actively commixed in the reactor. Suitable reactors for dynamic polymerization are kneading reactors as described in WO-A-01/38402 and WO-A-03/022896. Preference is given to a static polymerization.

The gel temperature at which the polymer gel is removed from the reactor is preferably at least 65° C., more preferably at least 75° C., even more preferably at least 80° C. and most preferably at least 85° C.

The monomer conversion at which the polymer gel is removed from the reactor is preferably not more than 85 mol %, more preferably not more than 80 mol %, even more preferably not more than 75 mol % and most preferably not more than 70 mol %.

One preferred embodiment of the present invention comprises removing the polymer gel from the reactor before attaining the peak temperature. The peak temperature is the highest temperature which is reached in the course of the polymerization and is typically in the range from 80 to 110° C., preferably in the range from 92 to 105° C. and more preferably in the range from 96 to 102° C.

The solids content of the monomer solution useful in the process of the present invention is preferably in the range from 23% to 70% by weight, more preferably in the range from 30% to 50% by weight and most preferably in the range from 35% to 45% by weight. The solids content is the sum total of all monomers not taking into account crosslinkers.

The starting temperature of the polymerization is preferably in the range from 0 to 30° C., more preferably in the range from 5 to 25° C. and most preferably in the range from 10 to 20° C. The starting temperature is the temperature of the monomer solution which is metered into the reactor.

Preferably, the polymer gel leaving the reactor is divided. The apparatuses with which the polymer gel can be divided are not subject to any restriction; meat grinders, kneaders and cutting blades can be used for example. A meat grinder presses the polymer gel through a perforated plate. A kneader is an apparatus having at least one shaft, the rotating shaft dividing the polymer gel through shearing forces. Kneaders are preferred.

After dividing, the polymer gel is preferably at least 90% by weight less than 50 mm in particle size.

One preferred embodiment comprises adding at least one release agent to the polymer gel before, during or after the dividing. Preferably, the release agent is added immediately before or during the dividing. Immediately before the dividing is here to be understood as meaning preferably up to 15 minutes, more preferably up to 10 minutes and most preferably up to 5 minutes before the dividing. Release agents reduce the sticking together of the divided gel particles. Suitable release agents are surfactants, for example having an HLB value of less than 12, such as sorbitan monooleate, inorganic powders, such as pyrogenic silica, and organic powders, such as water-absorbing polymeric particles. The HLB value is a measure of the water- or oil-solubility of surfactants and can be determined by customary methods, for example according to the methods indicated in "Surface Active Agents and Detergents", volume 2, Interscience Publishers, Inc., pages 479 ff, or taken from the published tables. The average particle size of the powders is typically less than 300 µm, preferably less than 250 µm, more preferably less than 200 µm and most preferably less than 150 µm. Suitable water-absorbing polymeric particles are preferably polymeric particles which arise during the production of water-absorbing polymeric particles and are separated off as undersize in the course of classifying. The particle size can be determined for example by EDANA (European Disposables and Nonwovens Association) recommended test method No. 420.2-02 "Particle size distribution". It is preferable to use dried water-absorbing polymeric particles having a water content of less than 10% by weight, preferably less than 5% by weight and more preferably less than 3% by weight. The water content can be determined for example by EDANA (European Disposables and Nonwovens Association) recommended test method No. 430.2-02 "Moisture content".

The process of the present invention divides the polymer gel in the presence of sufficient levels of monomer to make it possible for shearing damage to heal.

The divided polymeric gel is typically allowed to react supplementarily. This, like the upstream polymerization and the dividing of the polymer gel, preferably takes place under an inert gas, i.e., a gas which does not affect the polymerization, for example noble gases, nitrogen, carbon dioxide or water vapor, more preferably under nitrogen. The polymer gel can also be stored under reduced pressure, preferably at a pressure of below 900 mbar, more preferably below 800 mbar and most preferably below 500 mbar.

The supplementary reaction may utilize customary vessels, preferably cylindrical vessels having funnel-shaped bottoms. The vessel may communicate with the air or have an inert gas flow through it. The vessel may further be at a reduced pressure compared with the environment. For example, water vapor may thereby be removed from the gel. This prevents overheating of the polymer gel and reduces the water content of the polymer gel, facilitating subsequent drying.

However, the polymer gel may also be agitated during the supplementary reaction, for example by stirring.

The duration of the supplementary reaction after removal of the polymer gel from the polymerization reactor is typically up to 48 hours, preferably in the range from 0.2 to 30 hours, more preferably in the range from 0.5 to 24 hours and most preferably in the range from 2 to 12 hours, and the temperature during the supplementary reaction is for example in the range from 50 to 130° C., preferably in the range from 70 to 100° C. and more preferably in the range from 80 to 95° C.

The supplementary reaction continues the polymerization to the desired monomer conversion of preferably at least 98.5 mol %, more preferably at least 99 mol %, even more preferably at least 99.5 mol % and most preferably at least 99.9 mol %.

The supplementary reaction lowers the residual monomer content of the gel to typically below 2% by weight, preferably below 1.0% by weight, more preferably below 0.5% by weight, even more preferably below 0.2% by weight and most preferably below 0.1% by weight.

The process of the present invention makes it possible to utilize smaller reactors than hitherto customary. The savings achievable through the use of smaller reactors than hitherto customary are distinctly larger than the expenditures for the vessel for the supplementary reaction.

The process of the present invention may also be utilized to increase the capacity of existing belt reactors. For example by supplementing the belt reactor with an additional kneading reactor. This permits a higher belt speed and hence a higher throughput, the peak temperature shifting downstream, to beyond the belt for example.

Consequently, the processes of the present invention provide higher throughputs and yet produce water-absorbing polymeric particles having improved quality.

Preferably, the water-absorbing polymeric particles produced by the process of the present invention are in a dried, classified and postcrosslinked state.

The water-absorbing polymeric particles thus produced have high Centrifuge Retention Capacity (CRC) values, high Absorbency Under Load (AUL0.3 psi) values and low 16h extractables.

The crosslinked, water-absorbing polymeric particles are described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, volume 35, pages 73 to 103.

The Centrifuge Retention Capacity (CRC) value of the crosslinked, water-absorbing polymeric particles is typically in the range from 10 to 60 g/g, preferably at least 15 g/g, more preferably at least 20 g/g and most preferably at least 25 g/g. Centrifuge Retention Capacity (CRC) is determined by EDANA (European Disposables and Nonwovens Association) recommended test method No. 441.2-02 "Centrifuge retention capacity".

Water-absorbing polymeric particles may be produced by polymerization of a monomer solution comprising
a) at least one ethylenically unsaturated acid-functional monomer,
b) at least one crosslinker,
c) if appropriate one or more ethylenically and/or allylically unsaturated monomers copolymerizable with a), and d) if appropriate one or more water-soluble polymers onto which the monomers a), b) and if appropriate c) can be at least partly grafted, the base polymer obtained being dried, classified, aftertreated with e) at least one postcrosslinker, dried and thermally postcrosslinked.

Suitable monomers a) are for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred monomers. Acrylic acid is most preferable.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

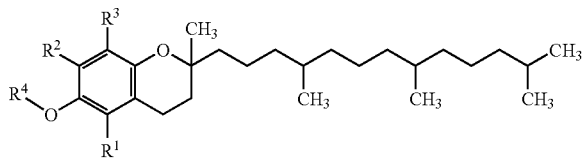

where $R^1$ is hydrogen or methyl, $R^2$ is hydrogen or methyl, $R^3$ is hydrogen or methyl and $R^4$ is hydrogen or an acyl radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3=$methyl, especially racemic alpha-tocopherol. $R^4$ is more preferably hydrogen or acetyl. RRR-alpha-tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

The water-absorbing polymeric particles are in a crosslinked state, i.e., the addition polymerization is carried out in the presence of compounds having at least two polymerizable groups which can be free-radically interpolymerized into the polymer network. Suitable crosslinkers b) are for example ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates as described in EP-A-0 547 847, EP-A-0 559 476, EP-A-0 632 068, WO-A-93/21237, WO-A-03/104299, WO-A-03/104300, WO-A-03/104301 and DE-A-103 31 450, mixed acrylates which, as well as acrylate groups, comprise further ethylenically unsaturated groups, as described in DE-A-103 31 456 and German patent application 10355401.7, or crosslinker mixtures as described for example in DE-A-1 95 43 368, DE-A-196 46 484, WO-A-90/15830 and WO-A-02/32962.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention utilizes di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol, of 2- to 6-tuply ethoxylated trimethylolpropane, of 3-tuply propoxylated glycerol, of 3-tuply propoxylated trimethylolpropane, and also of 3-tuply mixed ethoxylated or propoxylated glycerol, of 3-tuply mixed ethoxylated or propoxylated trimethylolpropane, of 15-tuply ethoxylated glycerol, of 15-tuply ethoxylated trimethylolpropane, and also of at least 40-tuply ethoxylated glycerol, of 40-tuply ethoxylated trimethylolethane and also of 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in WO-A-03/104301. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the water-absorbing polymer particles and the aqueous extracts of water-absorbing polymer particles produced therewith have an almost unchanged surface tension compared with water at the same temperature (typically not less than 0.068 N/m).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

The water-absorbing polymeric particles are produced by addition polymerization in aqueous solution according to a so-called gel polymerization process. In a gel polymerization process, aqueous solutions of one or more hydrophilic monomers and if appropriate of a suitable grafting base are addition polymerized in the presence of a free-radical initiator, preferably without mechanical commixing by exploiting the Trommsdorff-Norrish effect (Makromol. Chem. 1, 169 (1947)). The solids content of the aqueous solutions, i.e., the level of monomers, for example acrylic acid and sodium acrylate, is typically in the range from 23% to 70% by weight, preferably in the range from 30% to 50% by weight and more preferably in the range from 35% to 45% by weight. The aqueous monomer solution is applied to the belt at a temperature in the range from 0 to 30° C., preferably in the range from 10 to 25° C. and more preferably in the range from 15 to 20° C. The polymerization reaction can be carried out not only at atmospheric pressure but also under elevated or reduced pressure. As per usual, the polymerization can also be carried out in a protective gas atmosphere, preferably under nitrogen and/or water vapor. The polymerization may be induced using high-energy electromagnetic rays or the customary chemical polymerization initiators, examples being organic peroxides, such as benzoyl peroxide, tert-butyl hydroperoxide, methyl ethyl ketone peroxide, cumene hydroperoxide, azo compounds, such as azodiisobutyronitrile, and also inorganic peroxo compounds, such as $(NH_4)_2S_2O_8$ or $K_2S_2O_8$ or $H_2O_2$. They can be used, if appropriate, in combination with reducing agents such as sodium hydrogensulfite and iron(II) sulfate or redox systems where the reducing component is an aliphatic and aromatic sulfinic acid, such as benzenesulfinic acid and toluenesulfinic acid or derivatives thereof, such as Mannich adducts of sulfinic acid, aldehydes and amino compounds, as described in DE-A-13 01 566.

The gels obtained are neutralized to an extent which is for example in the range from 0 to 100 mol %, preferably between 5 and 90 mol % and more preferably between 25 and 80 mol %, based on monomer used, for which the customary neutralizing agents can be used, preferably alkali metal hydroxides or oxides, but more preferably sodium hydroxide, sodium carbonate and sodium bicarbonate. The pH of the neutralized base polymer is typically between 5 and 7.5 and preferably between 5.6 and 6.2.

Neutralization is customarily effected by admixing the neutralizing agent as an aqueous solution or else preferably as a solid. The neutralization is preferably carried out before the polymerization in the monomer solution. However, the polymer gel may also be neutralized or postneutralized. For this purpose, the gel is typically comminuted mechanically, by means of a meat grinder for example, and the neutralizing agent is sprayed, scattered or poured on and then carefully mixed in. The gel mass obtained may be repeatedly passed through the meat grinder again to effect homogenization.

The neutralized gel mass is dried using a belt or drum dryer for example until the residual moisture content is preferably below 10% by weight and in particular below 5% by weight. The dried base polymer is subsequently ground and sieved, and roll mills, pin mills or swing mills can customarily be used as grinding apparatus. The particle size of the sieved base polymer is preferably in the range from 45 to 1000 µm, more preferably in the range from 45 to 850 µm, even more preferably in the range from 100 to 800 µm and yet even more preferably in the range from 100 to 700 µm. Further preferred particle sizes are in the range from 100 to 500 µm, from 300 to 600 µm, less than 600 µm, less than 400 µm, more preferably less than 300 µm, and most preferably less than 150 µm. At least 80% and preferably at least 90% of all particles come within these ranges.

The CRC value [g/g] of the base polymer can be measured by the methods indicated in the description part and is preferably at least 27, in particular at least 29 and more preferably at least 31 and not more than 39 and preferably not more than 35.

The AUL0.3 psi value [g/g] of the base polymer can be measured by the methods indicated in the description part and is preferably at least 14, in particular at least 17 and more preferably at least 21 and not more than 27 and preferably not more than 23.

The postcrosslinking of water-absorbing polymeric particles is generally carried out by spraying a solution of the surface postcrosslinker onto the dry powder of base polymer. After spraying, the polymer powder is dried thermally, and the crosslinking reaction can take place not only before but also during drying.

The spraying with a solution of the crosslinker is preferably carried out in reaction mixers or mixing and drying ranges, for example Lödige® mixers, BEPEX® mixers, NAUTA® mixers, SCHUGI® mixers, NARA® dryers and PROCESSALL®. Fluidized bed dryers can be used as well.

Drying may take place in the mixer itself, by heating the jacket or introducing a stream of warm air. It is similarly possible to use a downstream dryer, for example a tray dryer, a rotary tube oven or a heatable screw. But it is also possible for example to utilize an azeotropic distillation as a drying process.

Preferred drying temperatures are in the range from 50 to 250° C., preferably in the range from 60 to 200° C. and more preferably in the range from 70 to 185° C. The preferred residence time at this temperature in the reaction mixer or dryer is below 60 minutes, preferably below 30 minutes and more preferably below 10 minutes.

The postcrosslinkers e) can be used alone or in combination with other postcrosslinkers, for example ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, glycerol diglycidyl ether, polyglycerol diglycidyl ether, epichlorohydrin, ethylenediamine, ethylene glycol, diethylene glycol, triethylene glycol, polyethylene glycol, propylene glycol, dipropylene glycol, tripropylene glycol, polypropylene glycol, butylene glycol, 1,3-propanediol, 1,4-butanediol, bisphenol A, glycerol, trimethylolpropane, pentaerythritol, sorbitol, diethanolamine, triethanolamine, ethylenediamine, ethylenecarbonate, propylenecarbonate, 2-oxazolidones, such as 2-oxazolidinone or N-hydroxyethyl-2-oxazolidinone, morpholine-2,3-diones, such as N-2-hydroxyethylmorpholine-2,3-dione, N-methylmorpholine-2,3-dione, N-ethylmorpholine-2,3-dione and/or N-tert-butylmorpholine-2,3-dione, 2-oxotetrahydro-1,3-oxazine, N-acyl-2-oxazolidones, such as N-acetyl-2-oxazolidone, bicyclic amide acetals, such as 5-methyl-1-aza-4,6-dioxabicyclo[3.3.0]octane, 1-aza-4,6-dioxabicyclo[3.3.0]octane and/or 5-isopropyl-1-aza-4,6-dioxabicyclo[3.3.0]octane, and/or bis- and poly-2-oxazolidinones.

The postcrosslinker is preferably dissolved in solvents which are not self-reactive, preferably in lower alcohols, for example methanol, ethanol, isopropanol, propylene glycol, ethylene glycol, more preferably isopropanol and most preferably in aqueous solutions of such suitable alcohols, in which case the alcohol content of the solution is in the range from 10% to 90% by weight, more preferably between 25% to 70% by weight, and especially between 30% to 50% by weight.

The postcrosslinker e) is used in an amount from 0.01% to 1% by weight, based on the polymer used, and the crosslinker solution itself is used in an amount from 1% to 20% by weight and preferably from 3% to 15% by weight, based on the polymer used.

Preferred postcrosslinkers e) are 2-oxazolidones, such as 2-oxazolidinone or N-hydroxyethyl-2-oxazolidinone, N-acyl-2-oxazolidones, such as N-acetyl-2-oxazolidone, 2-oxotetrahydro-1,3-oxazine, bicyclic amide acetals, such as 5-methyl-1-aza-4,6-dioxabicyclo[3.3.0]octane, 1-aza-4,6-dioxabicyclo[3.3.0]octane and/or 5-isopropyl-1-aza-4,6-dioxabicyclo[3.3.0]octane, bis-2-oxazolidones and/or poly-2-oxazolidones.

Particularly preferred postcrosslinkers e) are 2-oxazolidinone, N-hydroxyethyl-2-oxazolidinone or N-hydroxypropyl-2-oxazolidinone.

The CRC value [g/g] of the postcrosslinked water-absorbing polymeric particles produced according to the present invention can be measured by the methods indicated in the description part and is preferably at least 20, in particular at least 24, more preferably at least 25, in particular at least 26 and especially preferably at least 30.

The AUL0.7 psi value [g/g] of the postcrosslinked water-absorbing polymeric particles produced according to the present invention can be measured by the methods indicated in the description part and is preferably at least 15, in particular at least 21, more preferably at least 22, in particular at least 23 and especially preferably at least 25.

The 16h extractables value [% by weight] of the postcrosslinked water-absorbing polymeric particles produced according to the present invention can be measured by the methods indicated in the description part and is preferably less than 20, in particular less than 15, more preferably less than 12, in particular less than 10 and especially preferably less than 8.

Particle size ranges preferred according to the present invention are 150 to 850 µm, preferably 50 to 500 µm or 150 to 700 µm, more preferably 50 to 400 µm or 150 to 600 µm and most preferably 50 to 300 µm or 150 to 500 µm. At least 80% by weight, preferably at least 90% by weight and most preferably up to 100% by weight of all particles come within these ranges.

To determine the quality of postcrosslinking, the dried hydrogel is tested using the test methods described hereinbelow.

Methods:

The measurements should be carried out, unless otherwise stated, at an ambient temperature of 23±2° C. and a relative humidity of 50±10%. The water-absorbing polymeric particles are thoroughly mixed through before measurement.

Centrifuge Retention Capacity (CRC)

Centrifuge Retention Capacity can also be determined by EDANA (European Disposables and Nonwovens Association) recommended test method No. 441.2-02 "Centrifuge retention capacity".

Absorbency Under Load (AUL) 0.7 psi (4830 Pa)

Absorbency Under Load can also be determined by EDANA (European Disposables and Nonwovens Association) recommended test method No. 442.2-02 "Absorption under pressure".

Extractables 16h

The level of extractable constituents in the water-absorbing polymeric particles can be determined by EDANA (European Disposables and Nonwovens Association) recommended test method No. 470.2-02 "Determination of extractable polymer content by potentiometric titration".

The EDANA test methods are obtainable for example at European Disposables and Nonwovens Association, Avenue Eugène Plasky 157, B-1030 Brussels, Belgium.

EXAMPLES

Example 1

Acrylic acid (stabilized with 50 weight ppm of hydroquinone monomethyl ether) was 75 mol % neutralized with 50% by weight sodium hydroxide solution by cooling and diluted with water to prepare 1.5 kg of a monomer solution having a solids content of 35% by weight. Solids content refers to the sum total of the sodium acrylate and acrylic acid weight fractions in relation to the mass of the entire monomer solution. To this solution, which was cooled down to about 10° C., were added 1.71 g of triacrylate of altogether 3-tuply ethoxylated glycerol and mixed in. The monomer solution was transferred into an upwardly open deep freeze bag of polyethylene and purged with nitrogen for about 20 minutes to remove oxygen. A thermocouple was suspended in the center of the solution and an Eppendorf pipette was used to add 1.5 g of sodium persulfate dissolved in 13 g of water, 0.03 g of ascorbic acid dissolved in 10 g of water and 0.09 g of hydrogen peroxide (30% by weight) dissolved in 1.3 g of water in succession as initiators to the solution while it was being commixed with sparging nitrogen. The superior gas space was further blanketed with nitrogen until polymer gel removal. Polymerization ensued, and the bag was rapidly emptied, at an internal temperature of 91° C., by quickly turning it and expressing the gel directly into a running, preheated and insidedly nitrogen-blanketed meat grinder. Monomer conversion was about 90 mol %. The gel, which continued to polymerize, was divided in the meat grinder and collected downstream of the meat grinder's perforated disk in a nitrogen-purged deep freeze bag of polyethylene. The polymerization was then allowed to go to completion for a further 15 minutes, in the course of which the gel was heated at 90° C. in a circulating air cabinet. The gel was subsequently dried on Teflonized trays in a circulating air cabinet at 160° C. for 3 hours, ground using a laboratory pin mill and screened to a particle size of 250 to 850 µm. The properties of the dry base polymer thus obtained are listed in table 1.

The base polymer was postcrosslinked in a laboratory mixer. 20 g of base polymer were introduced as an initial charge into a Waring laboratory mixer in a mixing attachment having blunt stirring means and a hyperdermic syringe was used to gradually add the postcrosslinking solution dropwise at a low stirrer speed with efficient commixing. The postcrosslinking solution had the following composition: 1.5 g of isopropanol, 3.0 g of water, 0.02 g of 2-oxazolidinone. After efficient commixing, the moist polymer was dried on a watchglass in a circulating air drying cabinet at 180° C. for one hour. The dried polymer was subsequently screened through an 850 µm sieve to remove clumps. CRC and AUL0.7 psi were determined on these polymers; the values are entered in table 1.

Example 2

Example 1 was repeated except that the gel was removed at a gel temperature of 83° C. Monomer conversion at the time of gel removal was about 80 mol %.

Example 3

Example 1 was repeated except that the gel was removed at a gel temperature of 58° C. and was allowed to polymerize for a further 30 minutes to completion after division. Monomer conversion at the time of gel removal was about 55 mol %.

Example 4

Example 1 was repeated except that the gel was removed at a gel temperature of 87° C., directly emptied into a preheated and nitrogen-purged two-shaft laboratory kneader and immediately divided in this kneader by kneading. Monomer conversion was about 85 mol % at the time of gel removal. The gel was then allowed to react to completion in the kneader for about another 10 minutes.

Example 5

Example 1 was repeated except that the gel was removed at a gel temperature of 85° C., directly emptied into a preheated and nitrogen-purged two-shaft laboratory kneader, 150 g of fine (particle size 50 to 300 µm) dry water-absorbing polymer were added as a release agent to 1.5 kg of gel, and immediately divided in this kneader by kneading. Monomer conversion was about 85 mol % at the time of gel removal. The gel was then allowed to react to completion in the kneader for about another 10 minutes. The gel was very finely divided in the process and the surface was only minimally tacky.

Example 6

Example 1 was repeated except only 1.2 g of triacrylate of altogether 3-tuply ethoxylated glycerol were added and the gel was removed at a gel temperature of 86° C., directly emptied into a preheated and nitrogen-purged two-shaft laboratory kneader, 150 g of fine (particle size 50 to 300 µm) dry water-absorbing polymer were added as a release agent to 1.5 kg of gel, and immediately divided in the kneader by kneading. Monomer conversion was about 85 mol % at the time of gel removal. The gel was then allowed to react to completion in the kneader for about another 10 minutes. The gel was very finely divided in the process and the surface was only minimally tacky.

Example 7

Example 1 was repeated except that the gel was removed at a gel temperature of 81° C., directly emptied into a preheated and nitrogen-purged two-shaft laboratory kneader, 1.2 g of Span® 20 (sorbitan monolaurate) dispersed in about 50 ml of water were added as a release agent to 1.5 kg of gel, and immediately divided in this kneader by kneading. Monomer conversion was about 80 mol % at the time of gel removal. The gel was then allowed to react to completion in the kneader for about another 10 minutes. The gel was finely divided in the process and was barely tacky.

Comparative Example 1

Example 1 was repeated except that the gel was allowed to completely polymerize in the plastic bag, which was additionally thermally insulated toward the outside, the peak temperature in the center of the reaction mass being about 100° C., and the gel was emptied into the meat grinder only about 60 minutes after reaching the peak temperature and at the onset of cooling, and comminuted. Monomer conversion was more than 98 mol % at the time of gel removal. The comminuted gel was subsequently immediately dried, ground and sieved, all steps being carried out as described in Example 1. The polymer in this case was damaged by shearing, and this results in higher extractable polymeric fractions for the base polymer and a lower AUL 0.7 psi for the postcrosslinked polymer.

TABLE 1

Properties of base polymers and of postcrosslinked polymers

|  | CRC [g/g] | 16 h extractables [% by weight] | CRC* [g/g] | AUL 0.7 psi* [g/g] |
|---|---|---|---|---|
| Example 1 | 37.2 | 9.7 | 29.5 | 24.0 |
| Example 2 | 38.0 | 9.2 | 29.8 | 24.2 |
| Example 3 | 37.9 | 9.0 | 30.0 | 24.5 |
| Example 4 | 37.5 | 9.3 | 30.1 | 24.0 |
| Example 5 | 33.0 | 7.8 | 27.6 | 24.7 |
| Example 6 | 36.8 | 8.7 | 29.3 | 24.1 |
| Example 7 | 37.0 | 10.0 | 30.0 | 23.9 |
| Comparative Example 1 | 39.5 | 12.1 | 31.5 | 22.0 |

*postcrosslinked polymer

We claim:

1. A process for producing water-absorbing polymeric particles by reacting a monomer solution to form a polymer gel, which comprises (a) removing the polymer gel from a reactor when the temperature of the polymer gel formed in the course of the polymerization is at least 50° C. and before attaining a peak temperature, and monomer conversion is not more than 90 mol %, (b) dividing the polymer gel, and (c) storing the divided polymer gel under an inert gas and/or at a reduced pressure for 0.2 to 12 hours to supplementarily react the monomer in the absence of shearing.

2. The process according to claim 1 wherein a static polymerization is carried out in the reactor.

3. The process according to claim 1 wherein the polymer gel is removed from the reactor when the gel temperature is at least 65° C.

4. The process according to claim 1 wherein the peak temperature is in the range from 80 to 110° C.

5. The process according to claim 1 wherein a solids content of the monomer solution is in a range from 23% to 70% by weight.

6. The process according to claim 1 wherein a starting temperature of the polymerization is in the range from 0 to 30° C.

7. The process according to claim 1 wherein the polymer gel is divided after leaving the reactor.

8. The process according to claim 1 wherein at least one release agent is added to the polymer gel before or during dividing step (b).

9. The process according to claim 8 wherein dried water-absorbing polymeric particles are used as the release agent.

10. The process according to claim 8 wherein the release agent has an average particle size of less than 300 µm.

11. The process according to claim 1 wherein the polymer gel is divided in a kneader.

12. The process according to claim 1 wherein the polymer gel is postneutralized.

13. The process according to claim 1 wherein the polymer gel is dried, classified, and postcrosslinked.

14. The process according to claim 1 further comprising (d) drying the divided polymer gel after storing step (c).

15. The process according to claim 1 wherein the storing step (c) is conducted at a temperature in a range from 50° C. to 130° C.

16. The process according to claim 1 wherein the storing step (c) lowers a residual monomer content of the divided polymer gel to below 2%, by weight.

17. The process according to claim 1 wherein the supplementary reaction continues the polymerization to a monomer conversion of at least 98.5 mol. %.

* * * * *